US008688863B2

(12) United States Patent
Guo et al.

(10) Patent No.: US 8,688,863 B2
(45) Date of Patent: Apr. 1, 2014

(54) INFORMATION PROCESSING APPARATUS FOR CONDUCTING SECURITY PROCESSING AND SECURITY PROCESSING METHOD

(75) Inventors: Zhaogong Guo, Kawasaki (JP);
Kazuaki Nimura, Kawasaki (JP);
Kouichi Yasaki, Kawasaki (JP);
Yousuke Nakamura, Kawasaki (JP);
Isamu Yamada, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 13/032,259

(22) Filed: Feb. 22, 2011

(65) Prior Publication Data

US 2011/0213899 A1 Sep. 1, 2011

(30) Foreign Application Priority Data

Feb. 26, 2010 (JP) .................................. 2010-43046

(51) Int. Cl.
*G06F 3/00* (2006.01)
*H04M 1/66* (2006.01)

(52) U.S. Cl.
USPC ............................................ 710/7; 455/411

(58) Field of Classification Search
USPC .............................................. 710/7; 455/411
See application file for complete search history.

(56) References Cited

U.S. PATENT DOCUMENTS

| 5,675,781 | A | * | 10/1997 | Duncan et al. ................. 707/690 |
| 6,023,585 | A | | 2/2000 | Perlman et al. |
| 7,640,005 | B2 | * | 12/2009 | Matsumoto et al. .......... 455/411 |
| 7,802,112 | B2 | * | 9/2010 | Yasaki et al. .................. 713/194 |
| 2006/0278701 | A1 | | 12/2006 | Matsushita et al. |
| 2009/0276501 | A1 | * | 11/2009 | Saito ............................. 709/206 |
| 2010/0058077 | A1 | | 3/2010 | Matsuda et al. |
| 2010/0232607 | A1 | * | 9/2010 | Nimura et al. ................ 380/279 |

FOREIGN PATENT DOCUMENTS

| JP | 02-302813 | 12/1990 |
| JP | 04-167015 | 6/1992 |
| JP | 08-44571 | 2/1996 |
| JP | 2001-523365 | 11/2001 |
| JP | 2006-53721 | 2/2006 |
| JP | 2006-303817 | 11/2006 |
| JP | 2006-344112 | 12/2006 |
| WO | WO 2008-117467 A1 | 10/2008 |

* cited by examiner

*Primary Examiner* — Hyun Nam
(74) *Attorney, Agent, or Firm* — Fujitsu Patent Center

(57) ABSTRACT

An information processing apparatus that executes security processing for a storage device connected thereto, the apparatus includes a processing command storage unit that stores a plurality of processing commands related to security processing according to a type of the storage device, a determining unit that determines the type of the storage device connected thereto, an obtaining unit that obtains a processing command corresponding to the type determined by the determining unit from the processing command storage unit, and an executing unit that executes the security processing corresponding to the storage device based on the obtained processing command.

15 Claims, 20 Drawing Sheets

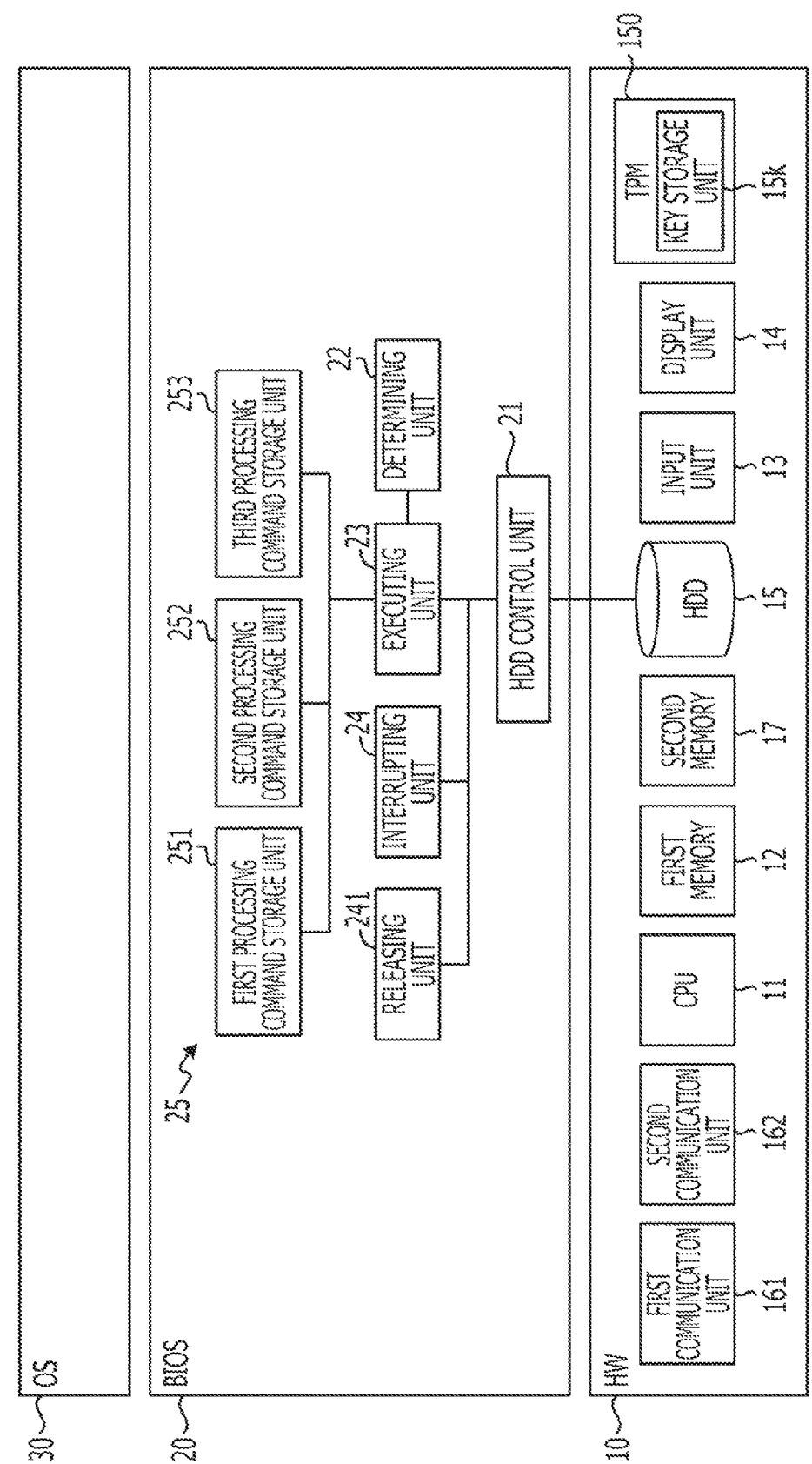

FIG. 3A

| TYPE ID | DELETION PROCESSING COMMAND | ACCESS FORBIDDEN PROCESSING COMMAND |
|---------|-----------------------------|-------------------------------------|
| 001     | WRITE RANDOM NUMBERS        | REWRITE HARD DISK PASSWORD          |

FIG. 3B

| TYPE ID | DELETION PROCESSING COMMAND | ACCESS FORBIDDEN PROCESSING COMMAND |
|---------|-----------------------------|-------------------------------------|
| 002     | DELETE KEY IN KEY STORAGE UNIT | TEMPORARILY FORBID USE           |

FIG. 3C

| TYPE ID | DELETION PROCESSING COMMAND | ACCESS FORBIDDEN PROCESSING COMMAND |
|---------|-----------------------------|-------------------------------------|
| 003     | UPDATE KEY IN HDD           | USE FORBIDDEN COMMAND               |

FIG. 7

| TYPE ID | ORDER OF OPERATIONS |
|---|---|
| 001 | DELETION PROCESSING → INTERRUPTION PROCESSING |
| 002 | INTERRUPTION PROCESSING → DELETION PROCESSING |
| 003 | DELETION PROCESSING → INTERRUPTING COMMAND |

26

US 8,688,863 B2

INFORMATION PROCESSING APPARATUS FOR CONDUCTING SECURITY PROCESSING AND SECURITY PROCESSING METHOD

CROSS-REFERENCE TO RELATED APPLICATIONS

This application is based upon and claims the benefit of priority of the prior Japanese Patent Application No. 2010-43046, filed on Feb. 26, 2010, the entire contents of which are incorporated herein by reference.

FIELD

The embodiments discussed herein are related to an information processing apparatus that conducts security processing for a memory device connected thereto, and an execution method.

BACKGROUND

Information processing apparatuses such as personal computers and the like are occasionally lost due to theft or misplacement when taken out of the home or office. Important data that may be stored in the information processing apparatus may be seen by third parties if the information processing apparatus is lost. Conventionally, when an information processing apparatus is lost, an instruction to delete data is sent from a wireless base station to the information processing apparatus via a control signal (for example, see Japanese laid-open patent publication No. 2006-303817).

SUMMARY

According to an aspect of an embodiment of the invention, an information processing apparatus that executes security processing for a storage device connected thereto, the apparatus includes a processing command storage unit that stores a plurality of processing commands related to security processing according to a type of the storage device, a determining unit that determines the type of the storage device connected thereto, an obtaining unit that obtains a processing command corresponding to the type determined by the determining unit from the processing command storage unit; and an executing unit that executes the security processing corresponding to the storage device based on the obtained processing command.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 2 is a block diagram of hardware and software modules of a personal computer;

FIGS. 3A to 3C illustrate record layouts of a processing command storage unit;

FIG. 7 illustrates a record layout of a table;

DESCRIPTION OF EMBODIMENTS

First Embodiment

Figure 1:
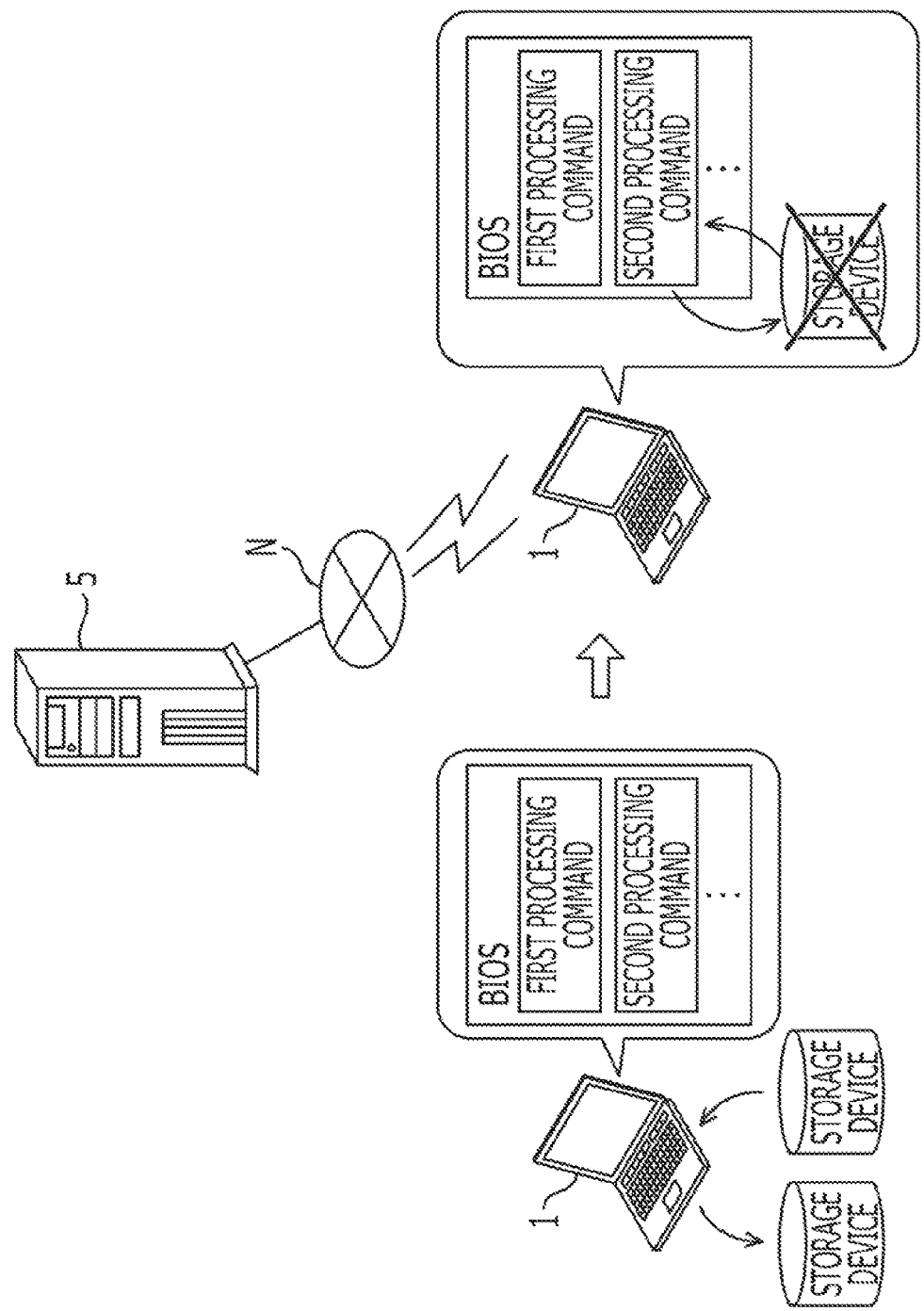
FIG. 1 is a schematic drawing illustrating an example of a processing system.

The following embodiments will be disclosed with reference to the drawings. FIG. 1 is a schematic drawing illustrating an example of a processing system. The processing system includes an information processing apparatus 1 and a server computer 5. The information processing apparatus 1 may be, for example, a notebook type personal computer, a desktop personal computer, a PDA (Personal Digital Assistant), a mobile telephone, a game console, an electronic book reader, and the like. Hereinafter, a personal computer 1 will be used as an example of the information processing apparatus 1 in the following description. The personal computer 1 is connected to the server computer 5 through a communication network N such as an internet network or a mobile telephone network.

A basic input/output system (BIOS), which is a group of programs for controlling a removable storage device, is stored in a memory in the personal computer 1. Multiple processing commands to execute security processing for various types of storage devices are stored beforehand in the BIOS. If the personal computer 1 is lost or stolen, the server computer 5 sends a security processing command to the personal computer 1 through the communication network N. The personal computer 1 receives the security processing command. The personal computer 1 determines the type of storage device after receiving the security processing command. The personal computer 1 obtains one processing command that corresponds to the type of storage device from among multiple processing commands. The personal computer 1 executes the security processing corresponding to the storage device based on the obtained processing command. The above process will be described in detail below.

FIG. 2 is a block diagram of hardware and software modules of a personal computer 1. The personal computer 1 includes hardware (HW) 10, a BIOS 20, and an operating system (hereinafter referred to as "OS") 30. A removable storage device is connected to the personal computer 1 and the BIOS 20 controls the storage device connected to the personal computer 1. The storage device may be, for example, a hard disk drive (hereinafter referred to as "HDD") or a flash memory drive such as a solid state drive (SSD). The storage device may also be an optical disk such as a blue ray disk, a universal serial bus (USB) memory, or a memory card or the like. In the following description, the HDD will be used as an example of a connectable storage device.

The personal computer 1 includes a CPU 11 as a control unit, a first memory 12, a second memory 17, a first communication unit 161, a second communication unit 162, an HDD 15, an input unit 13, a display unit 14, and a trusted platform module (TPM) 150. The CPU 11 is connected to the hardware units through a bus. The CPU 11 controls the hardware units and executes software processing according to a program stored in the BIOS 20. The first memory 12 is, for example, a static RAM (SRAM), a dynamic RAM (DRAM), or a flash memory and the like. The first memory 12 temporarily stores data created when the CPU 11 executes the various programs.

The second memory 17 is, for example, a non-volatile memory such as a flash memory and stores the BIOS 20 that executes the security processing. The HDD 15 is a hard disk drive and stores the OS 30 and various types of application software. The input unit 13 is an input device such as a mouse, a keyboard, or a touch panel. The input unit 13 outputs received operating information to the CPU 11. The display unit 14 is a liquid crystal display or an electroluminescence (EL) display. The display unit 14 displays various types of information based on instructions from the CPU 11.

The TPM 150 is a security chip having hardware anti-tampering performance and has a key storage unit 15k provided therein. The CPU 11 encodes data using an encoding key for encoding stored in the key storage unit 15k, and then stores the encoded data in the HDD 15. The CPU 11 uses a decoding key stored in the key storage unit 15k when decoding the encoded data. The method of encoding data and storing the data in the HDD 15 is not limited to the above, and other methods may be used depending upon the type of HDD 15.

For example, an encoding key for encoding and a decoding key for decoding (hereinafter referred to as "encryption keys") may be stored in advance in the HDD 15. The CPU 11 uses the encryption keys stored in the HDD 15 to encode the data to be stored in the HDD 15. The CPU 11 uses the encryption keys stored in the HDD 15 to decode the encoded data stored in the HDD 15. The HDD 15 may be various types of connected HDDs depending upon the design. For example, HDDs that do not conduct encoding, HDDs that conduct encoding using the aforementioned TPM 150, and hard disks with the Opal SSC (Opal Security Subsystem Class) specification formulated by the Trusted Computing Group also exist. Moreover, an SSD that can conduct various encoding processes may be connected in place of the HDD 15. The description in the present embodiment will use an example where three types of HDDs are connected to simplify the description.

The first communication unit 161 is, for example, a wired or wireless LAN (local area network) card, and sends and receives information to and from the server computer 5 or the like using HTTP (HyperText Transition Protocol) or the like. The second communication unit 162 is a PHS (Personal Handyphone System) or a mobile telephone communication module, and receives security processing commands from the server computer 5. The second communication unit 162 receives power from a battery (not illustrated) even when the main power source of the personal computer 1 is off. The second communication unit 162 activates the personal computer 1 upon receiving a security command. The CPU 11 conducts the security process stored in the BIOS 20.

The BIOS 20 illustrated in FIG. 2 includes an HDD control unit 21, a determining unit 22, an executing unit 23, an interrupting unit 24, a releasing unit 241, a processing command storage unit 25, and the like. Upon executing BIOS 20 programs stored in the second memory 17 by the CPU 11, the BIOS 20 functions as the HDD control unit 21, the determining unit 22, the executing unit 23, and the interrupting unit 24. The HDD control unit 21 conducts controls related to security processing for the HDD 15. The determining unit 22 determines the type of HDD 15 connected to the personal computer 1. The determining unit 22 determines the type of HDD 15 by referring to unique identification information imparted to the HDD 15. Specifically, the determining unit 22 outputs an identify device command to the HDD 15. The HDD 15 outputs detailed information including the previously imparted type information to the determining unit 22. The determining unit 22 determines the type by referring to the type information. Moreover, the determining unit 22 may determine the type of HDD 15 based on the name or the serial number of the HDD 15 and the like.

After receiving the security processing command from the CPU 11, the executing unit 23 executes the security processing for the HDD 15 based on the command related to the security processing stored in the processing command storage unit 25. The processing command storage unit 25 includes a plurality of different types of processing command storage units 25. In the present embodiment, a first processing command storage unit 251, a second processing command storage unit 252, and a third processing command storage unit 253 (which may be referred to together as the "processing command storage unit 25") are stored in the personal computer 1. The executing unit 23 functioning as an obtaining unit reads out the processing commands corresponding to the type of HDD 15 from the first processing command storage unit 251, the second processing command storage unit 252, and the third processing command storage unit 253 based on the type determined by the determining unit 22.

FIGS. 3A to 3C illustrate record layouts of the processing command storage units 25. FIG. 3A illustrates the record layout of the first processing command storage unit 251, FIG. 3B illustrates the record layout of the second processing command storage unit 252, and FIG. 3C illustrates the record layout of the third processing command storage unit 253. The first processing command storage unit 251 includes a type ID field and processing command fields and the like. The type ID field stores an ID for specifying a type of the HDD 15. The processing command field stores a processing command related to security processing. Multiple processing command storage units 25 are provided since there are different processing commands due to variations in the specifications of the HDD 15. The executing unit 23 reads out the corresponding processing command based on the type determined by the determining unit 22 and on the type ID stored in the processing command storage unit 25.

The processing command related to the security processing for the HDD 15 includes, for example, a deletion command for the HDD 15 and an access forbidden command that forbids access to the HDD 15. The deletion command is a command to write, for example, random numbers or certain values (for example zeroes), or a command to cancel or update the encryption keys stored in the HDD 15. Moreover, the deletion command is, for example, a command to delete or update the encryption keys stored in the key storage unit 15*k* in the TPM 150. By updating or deleting the encryption keys, the data stored in the HDD 15 is not allowed to be read and is deleted. The access forbidden command is, for example, a command by the HDD control unit 21 to prevent data from being inputted or outputted between the HDD 15 and the CPU 11, or a command to temporarily rewrite a password set in the HDD 15 to another password to prevent the input and output of data. Moreover, the access forbidden command is a command to display a screen on the display unit 14 for inputting a password to allow use of the personal computer 1, and then prevent access to the HDD 15 and the personal computer 1 if the password inputted from the input unit 13 does not match the password stored in the processing command storage unit 25.

The first processing command storage unit 251 illustrated in FIG. 3A stores, as an example, a deletion command to delete data by writing random numbers, and a command to prevent access by temporarily rewriting the HDD 15 password. The second processing command storage unit 252 illustrated in FIG. 3B stores, as an example, a deletion command to delete the encryption key in the key storage unit 15*k*, and a command to prevent access by temporarily forbidding the use of the encryption key stored in the key storage unit 15*k* for a certain period of time (for example, 1 week). The third processing command storage unit 253 illustrated in FIG. 3C stores, as an example, a deletion command to update the encryption key stored in the HDD 15, and a command to prevent access by issuing a use forbidden command. The security processing for the HDD 15 described above is merely an example and is not limited in this respect. For example, deletion processing may be executed by writing random numbers only in a predetermined storage region of the HDD 15. Similarly, a processing command to execute only access forbidden processing, or to execute both deletion processing and access forbidden processing may be stored in the processing command storage unit 25 depending upon the policy of the security processing.

Moreover, the executing unit 23 executes a releasing process to release the security processing related to the HDD 15. After executing the access forbidden processing command for the HDD 15, the executing unit 23 releases the access forbidden command when a password that matches the password stored in the processing command storage unit 25 is inputted from the input unit 13. Alternately, the access forbidden command may be released when a release command is received from the server computer 5 via the second communication unit 162.

Figure 4:
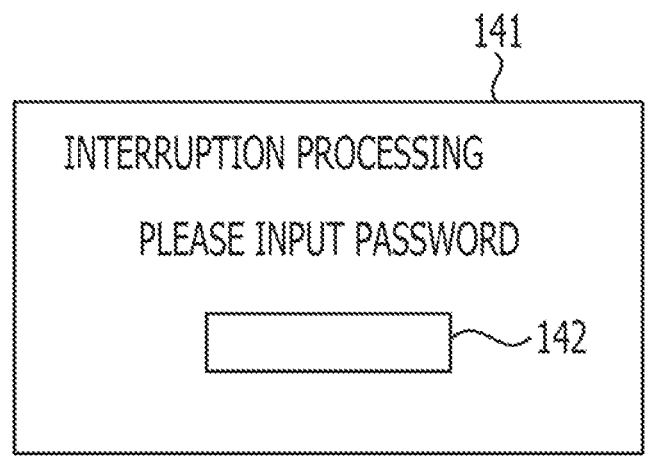
FIG. 4 is an image of interruption processing.

The interrupting unit 24 conducts processing to interrupt processing following the BIOS 20 processing. Specifically, the interrupting unit 24 interrupts the transition to processing based on the OS 30 stored in the HDD 15. The releasing unit 241 releases the interrupting processing conducted by the interrupting unit 24. FIG. 4 is an image of interruption processing. The interrupting unit 24 displays a password input screen 141 on the display unit 14. A user of the personal computer 1 obtains a password to release the interruption processing from an administrator by telephone, facsimile, or email and the like, and enters the password into a password input box 142 using the input unit 13.

The interrupting unit 24 continues to interrupt the transition to the OS 30 if the password does not match. If the password entered into the password input box 142 matches the password stored in the BIOS 20, the interrupting unit 24 outputs an enabling signal to the releasing unit 241. The releasing unit 241 releases the interruption processing. As a result, the OS 30 can be operated. Although the input of a password is used as a condition to release the interruption processing in the present embodiment, this is merely an example and the invention is not limited in this respect. For example, the releasing unit 241 may release the interruption command when a release command is received from the server computer 5 through the second communication unit 162. Moreover, the interruption processing by the interrupting unit 24 is not necessarily executed. Information on whether to execute the interruption processing is stored in the second memory 17 or the like, and the interrupting unit 24 executes the interruption processing if the information is stored in the second memory 17.

Figure 5:
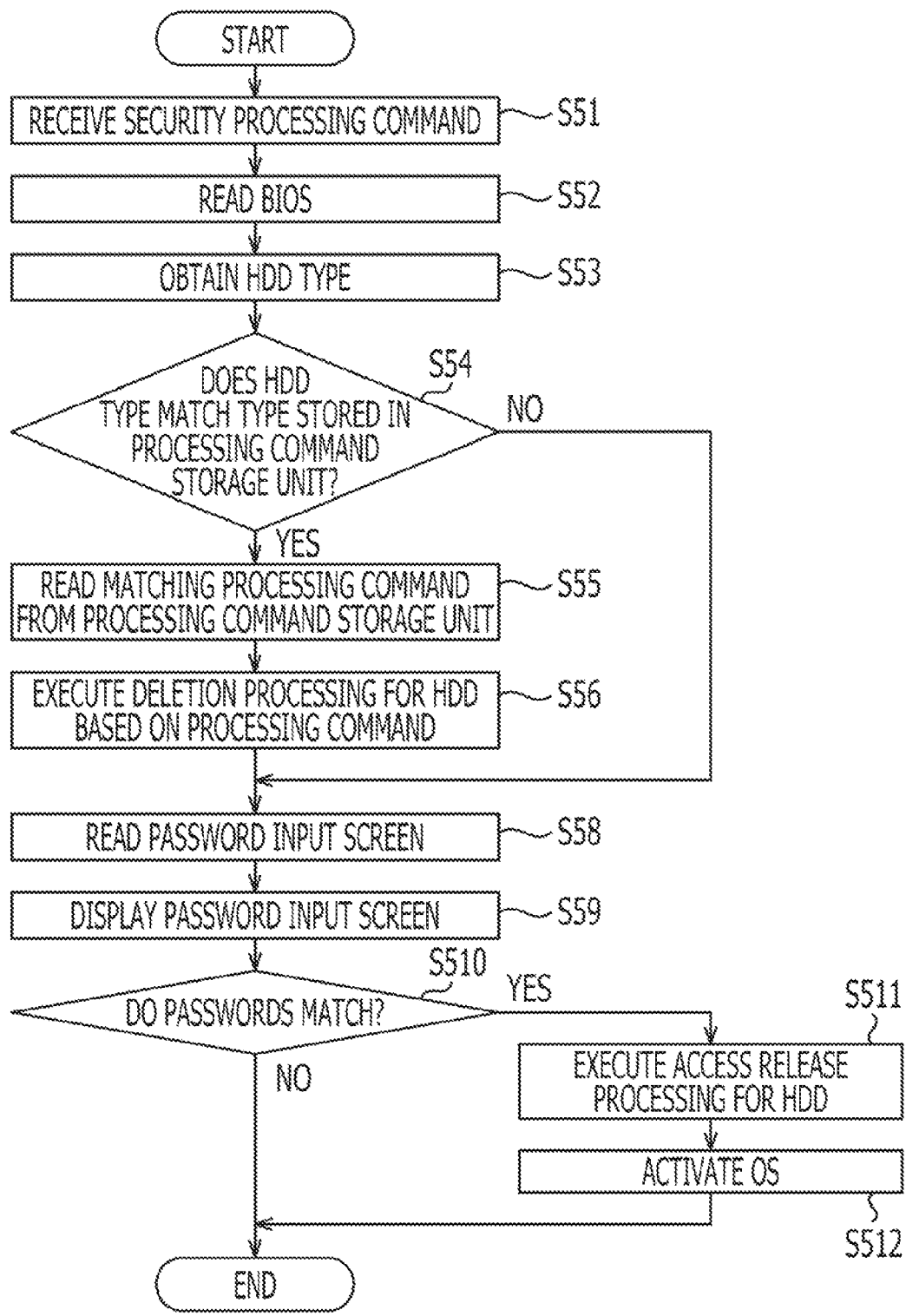
FIG. 5 is a flowchart depicting security processing procedures.

The software processing related to the security processing conducted, when the personal computer 1 is turned on, for the hardware described above will be described using a flowchart. FIG. 5 is a flowchart depicting security processing procedures. The server computer 5 sends a security processing command to the personal computer 1. The second communication unit 162 receives the security processing command from the server computer 5 (S51). The second communication unit 162 activates the personal computer 1. The CPU 11 reads the BIOS 20 stored in the second memory 17 from the first memory 12 (S52). The CPU 11 obtains the type of HDD 15 connected thereto (S53).

The CPU 11 determines whether or not the obtained type matches the types stored in the first processing command storage unit 251, the second processing command storage unit 252, and the third processing command storage unit 253 (S54). If the CPU 11 determines that there is a match (S54: Yes), the CPU 11 reads the processing command from the processing command storage unit 25 that matches the type (S55). The CPU 11 executes the deletion processing for the HDD 15 according to the processing command (S56). The processing command in relation to the security processing hereinafter indicates the deletion processing command for the HDD 15 to simplify the following description. If the CPU 11 determines that the obtained type does not match (S54: No), the CPU 11 reads out the password input screen stored in the second memory 17 (S58). The CPU 11 displays the password input screen on the display unit 14 (S59).

The CPU 11 determines whether or not the password entered from the input unit 13 matches the password stored in the second memory 17 (S510). If the CPU 11 determines that the passwords match (S510: Yes), the CPU 11 executes the release processing to allow access to the HDD 15 (S511). The CPU 11 activates the OS 30 (S512). In this way, the interruption processing is released. If the CPU 11 determines that the passwords do not match (S510: No), the interruption processing is maintained and the processing ends without activating the OS 30. In the present embodiment, the processing is ended if the password is incorrectly input one time (S510: No). However, this is merely an example and the invention is not limited in this respect. The CPU 11 may return to the processing to display the password input screen (S59) a plurality of times (for example, three times) when the password is input incorrectly (S510: No). Upon completion of the activation of the personal computer 1, the CPU 11 outputs an enforced reset signal to the HW 10 in the software processing related to the security processing under the activated OS 30. The CPU 11 executes the software processing related to the security processing when the personal computer 1 is activated as illustrated in the flowchart depicting the security processing procedures in FIG. 5. However, the above processing is merely an example and is not limited in this respect. For example, a security processing program to operate under the activated OS 30 may be prepared for executing the software processing related to the security processing for the HDD 15 and the personal computer 1.

In this way, even if various types of storage devices are connected during the manufacture of the personal computer 1, it is possible to execute security processing functions corresponding to the type. Moreover, even if storage devices are replaced after shipping the personal computer 1, security processing corresponding to the connection conditions can be achieved by switching the processing command storage units 25 in accordance with the type.

Second Embodiment

Figure 6:
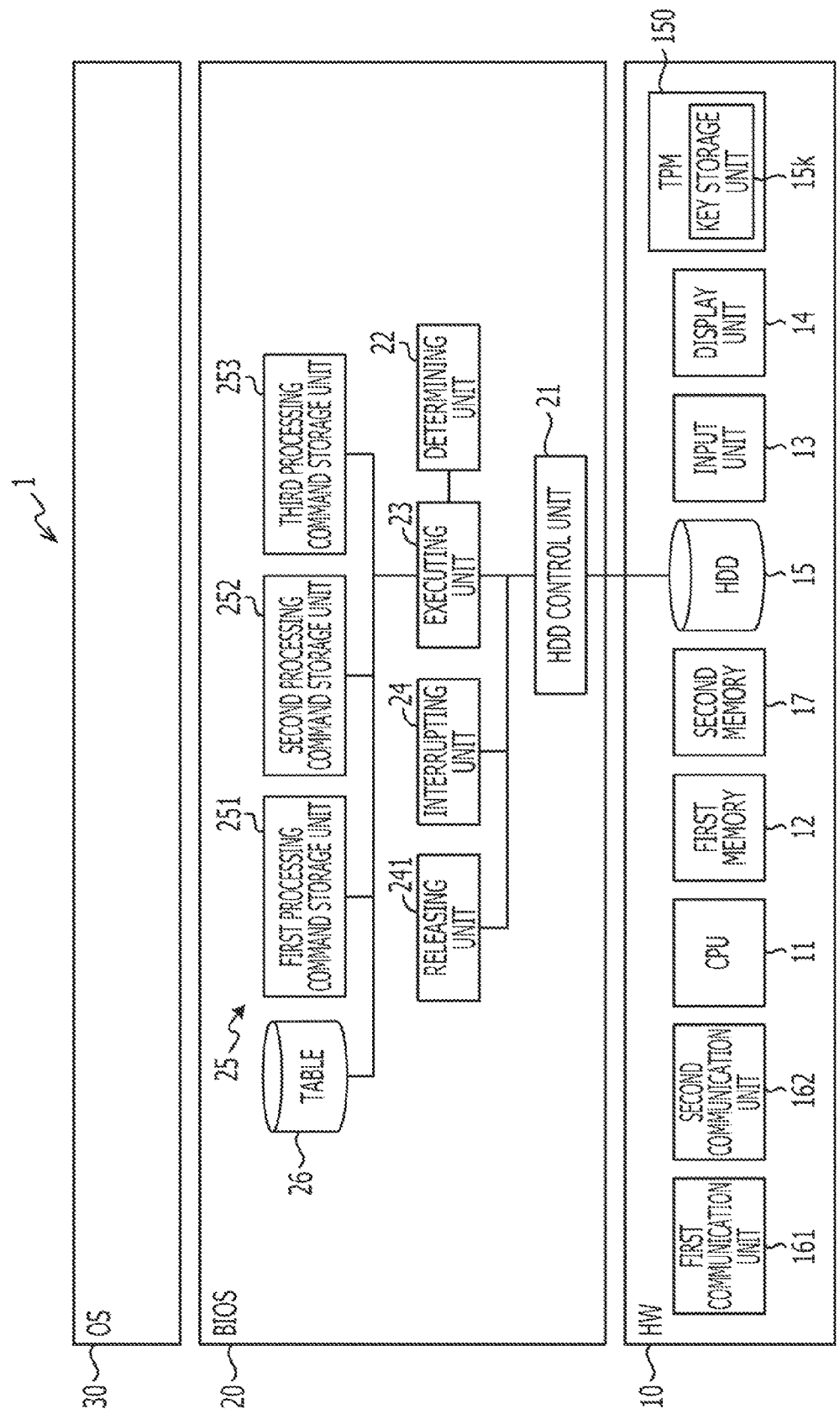
FIG. 6 is a block diagram of hardware and software modules of a personal computer according to a second embodiment.

A second embodiment relates to a process for prioritizing the deletion processing or the interruption processing. FIG. 6 is a block diagram of hardware and software modules of a personal computer 1 according to the second embodiment. The BIOS 20 includes a table 26. FIG. 7 illustrates a record layout of the table 26. The table 26 includes a type ID field and an order of operations field. The order of operations field stores, in association with the type ID field, an order of operations indicating whether the deletion processing or the interrupting processing is to be conducted first. For example, if the first processing command storage unit 251 is the type ID "001," first the deletion processing for the HDD 15 is conducted and then the processing to interrupt the OS 30 is conducted. The table 26 illustrated in FIG. 7 is merely an example and embodiments of the present invention are not limited in this respect. Only the processing to be conducted first may be stored in the order of processing field. Moreover, the order of operations of the processing may be changed in response to a request from the security processing. The CPU 11 stores the order of operations of the processing in association with the type ID of the HDD 15 connected thereto upon receiving the order of operations from the security processing.

Figure 8:
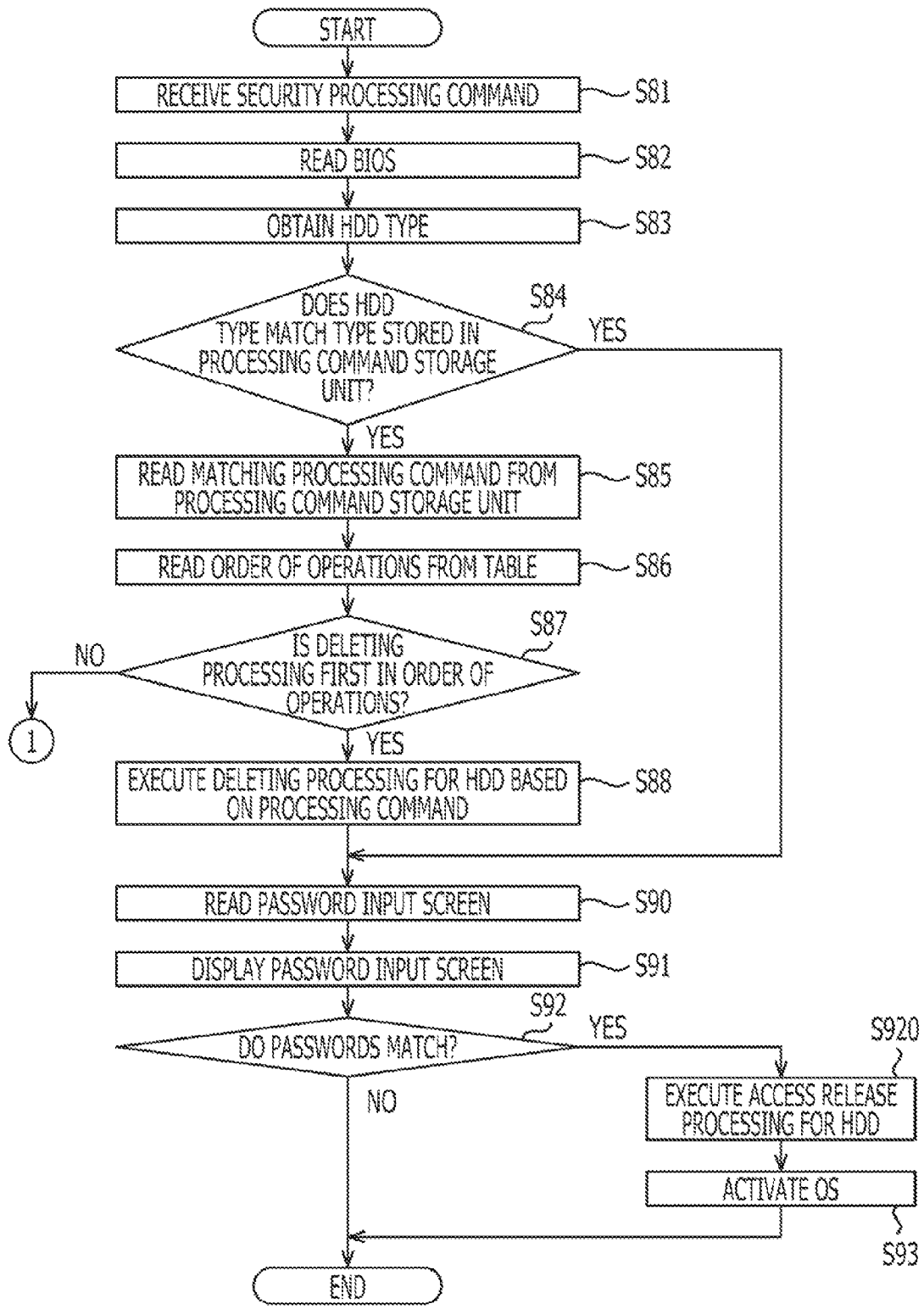
FIG. 8 is a flowchart depicting security processing procedures according to the second embodiment.
Figure 9:
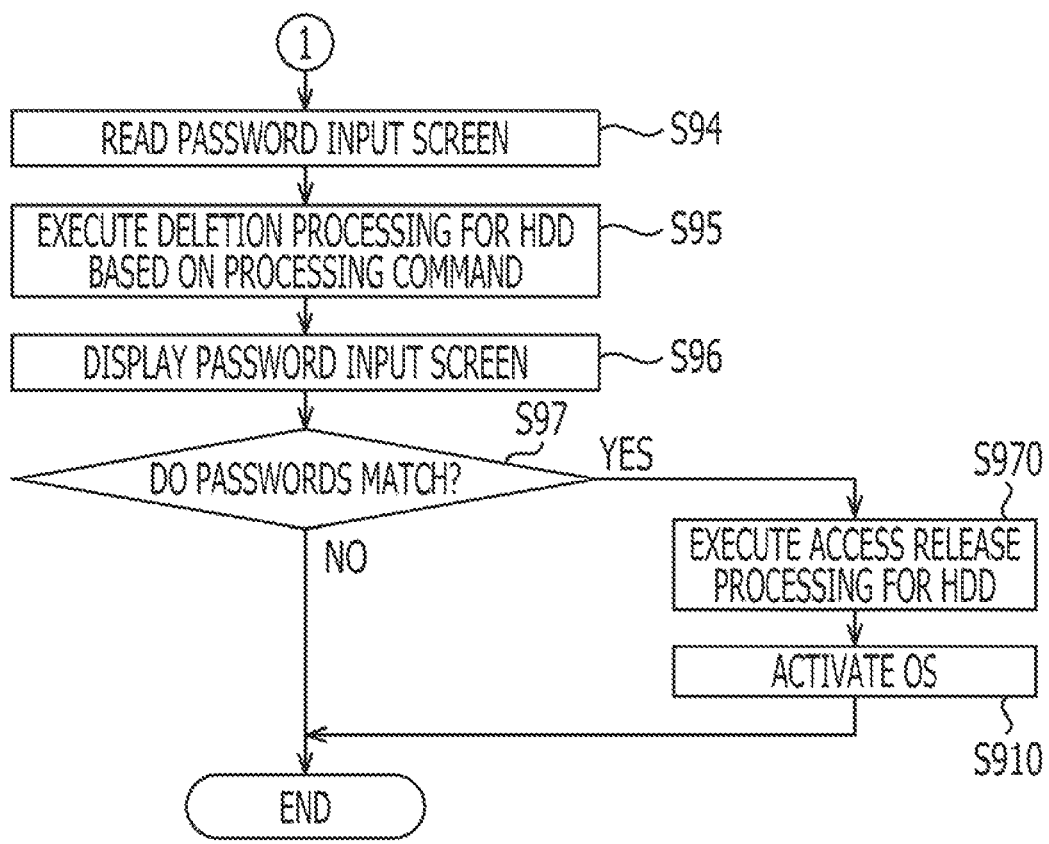
FIG. 9 is a flowchart depicting security processing procedures according to the second embodiment.

FIGS. 8 and 9 illustrate a flowchart depicting security processing procedures according to the second embodiment. Steps S81 to S85 are the same as the aforementioned steps S51 to S55 and the description will be omitted. The CPU 11 reads the order of operations of the processing stored in association with the type obtained in S83 from the table 26 (S86). The CPU 11 operating as a selector determines whether or not the deletion processing for the HDD 15 connected thereto is to be conducted first (S87). If the CPU 11 determines that the deletion processing is to be conducted first (S87: Yes), the deletion process is conducted for the HDD 15 based on the processing command that has been read in Step S85 (S88). If the CPU 11 determines that the obtained type does not match (S84: No), the CPU 11 reads out the password input screen stored in the second memory 17 (S90). The CPU 11 displays the password input screen on the display unit 14 (S91).

The CPU 11 determines whether or not the password entered from the input unit 13 matches the password stored in the second memory 17 (S92). If the CPU 11 determines that the passwords match (S92: Yes), the CPU 11 executes the release processing to allow access to the HDD 15 (S920). The CPU 11 activates the OS 30 (S93). As a result, the interruption processing is released after the deletion processing. If the CPU 11 determines that the passwords do not match (S92: No), the interruption processing is maintained and the processing ends without activating the OS 30. If the CPU 11 determines in S87 that the deletion processing is not to be conducted first (S87: No), the CPU 11 reads the password input screen stored in the second memory 17 (S94). The deletion processing for the HDD 15 is conducted based on the processing command corresponding to the type read in S85 (S95). The CPU 11 displays the password input screen on the display unit 14 (S96).

The CPU 11 determines whether or not the password entered from the input unit 13 matches the password stored in the second memory 17 (S97). If the CPU 11 determines that the passwords match (S97: Yes), the CPU 11 executes the release processing to allow access to the HDD 15 (S970). The CPU 11 activates the OS 30 stored in the HDD 15 (S910). In this way, the interruption processing is released. If the passwords do not match (S97: No), the CPU 11 maintains the interruption processing and completes the processing without activating the OS 30. In this way, it is possible to switch between the processing corresponding to each type of HDD 15. Furthermore, by previously setting the order of operations of the deletion processing for the HDD 15, it is possible to easily support the deletion processing even when rapid operation of the deletion processing for the HDD 15 is desired.

The above is a description of the second embodiment of the present invention, wherein other elements are the same as the first embodiment and therefore like elements are indicated with like reference numerals and the corresponding descriptions are omitted.

Third Embodiment

Figure 10:
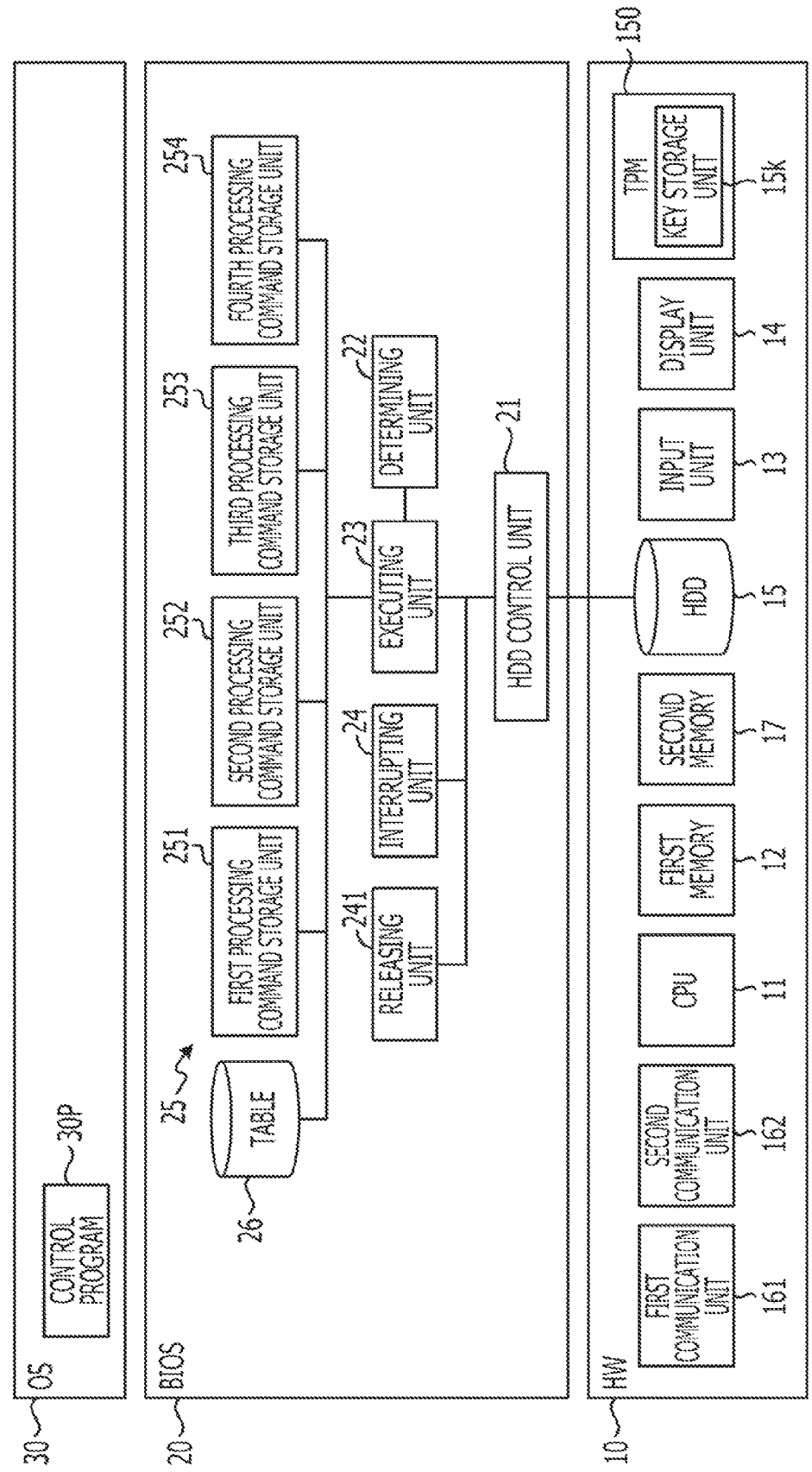
FIG. 10 is a block diagram of hardware and software modules of a personal computer according to a third embodiment.

A third embodiment of the present invention relates to additions to the processing command storage unit 25. FIG. 10 is a block diagram of hardware and software modules of a personal computer 1 according to the third embodiment. The OS 30 layer includes a control program 30P for updating the processing command storage unit 25. When the determining unit 22 cannot identify the connected HDD 15, a processing command corresponding to a new type of HDD is received from the server computer 5 via the first communication unit 161 functioning as a receiving unit, based on controlling by the control program 30P. The processing command corresponding to the type of HDD may be received from another computer instead of the server computer 5. The received processing command is stored in the processing command storage unit 25 along with the type. In the example illustrated in FIG. 10, the type and the processing command are stored in a fourth processing command storage unit 254.

The CPU 11 also stores the order of operations and the type ID of the new type in the table 26. In the present embodiment, in principle, the deletion processing is stored by default as the first processing in the order of operations. In the present embodiment, receiving the processing command through the first communication unit 161 is merely an example and is not limited in this respect. For example, after activating the personal computer 1, the processing command corresponding to the new type may be received through the second communication unit 162. Furthermore, the CPU 11 may access the server computer 5 regularly (for example once a week) to receive the processing command and the type through the first communication unit 161. In this case, the CPU 11 stores the received type and processing command as a new processing command storage unit 25.

Figure 11:
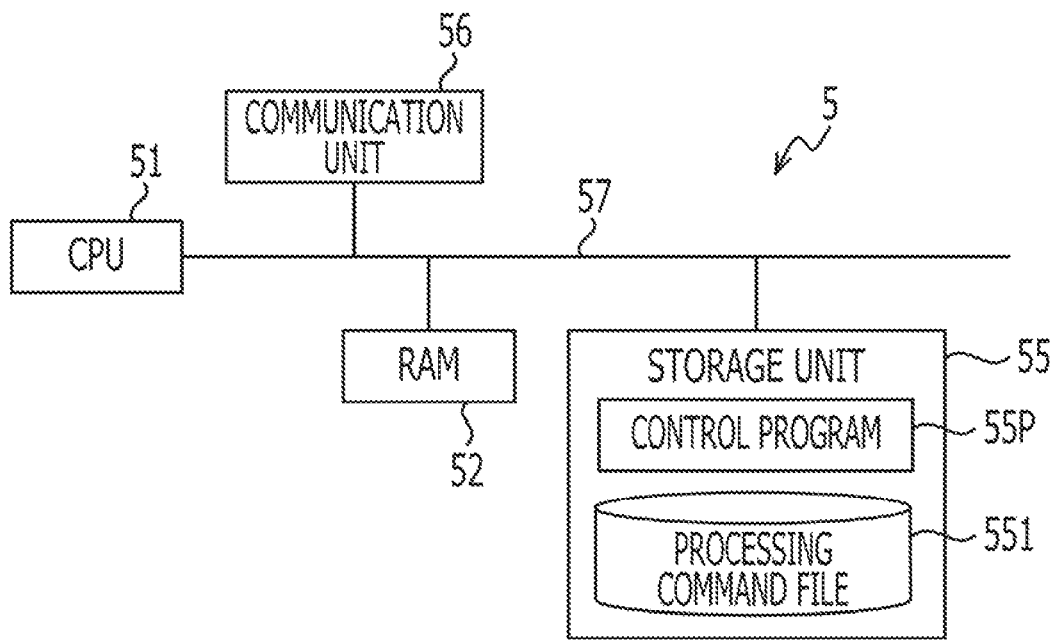
FIG. 11 is a block diagram of a hardware group of a server computer.

FIG. 11 is a block diagram illustrating a hardware group of a server computer 5. The server computer 5 includes a CPU 51 as a control unit, a RAM 52, a communication unit 56, and a storage unit 55. The CPU 51 is connected to the hardware units through a bus 57. The CPU 51 controls the hardware units and executes various software functions according to a control program 55P stored in the storage unit 55.

The communication unit 56 is connected to a network such as a LAN or the like, and is connected to a communication network N via a gateway or a firewall and the like. Information is sent to and received from a personal computer 1 and a mobile telephone and the like. The storage unit 55 is configured, for example, as a hard disk or a large capacity memory, and stores the aforementioned control program 55P and a processing command file 551. The RAM 52 is for example a SRAM, DRAM, or a flash memory and the like. The RAM 52 temporarily stores data created when the CPU 51 executes various programs.

Processing commands related to security processing corresponding to the type of HDD 15 are stored in the processing command file 551. When the CPU 51 receives a request to obtain a processing command corresponding to the type from the personal computer 1, the CPU 11 reads the processing command corresponding to the type from the processing command file 551. The CPU 51 sends the read processing command to the personal computer 1. As a result, the CPU 11 of the personal computer 1 can store the processing command and the type in a new processing command storage unit 25. The order of operations may also be stored in the processing command file 551 in the server computer 5 in association with the type.

Figure 12:
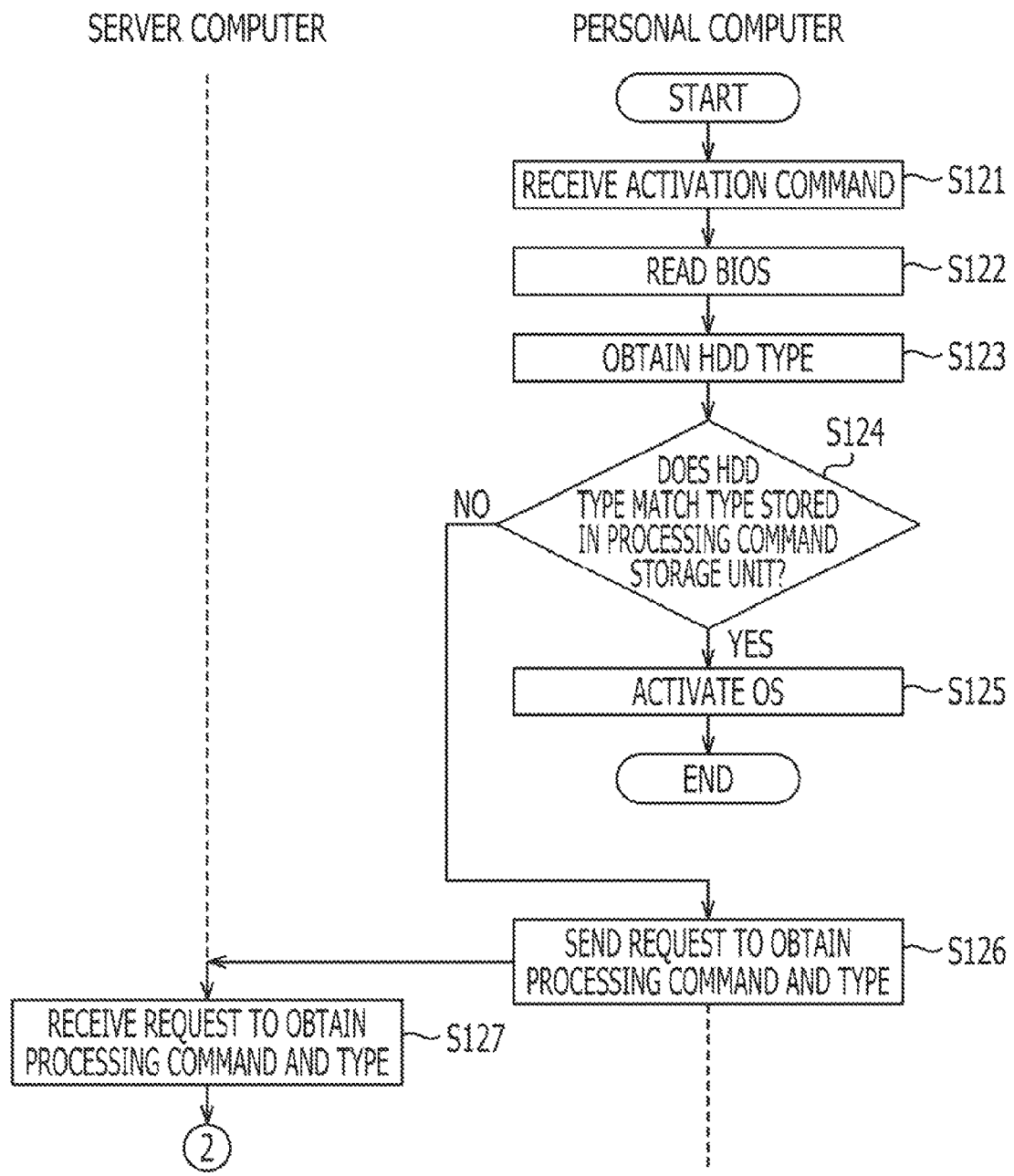
FIG. 12 is a flowchart depicting update processing procedures.
Figure 13:
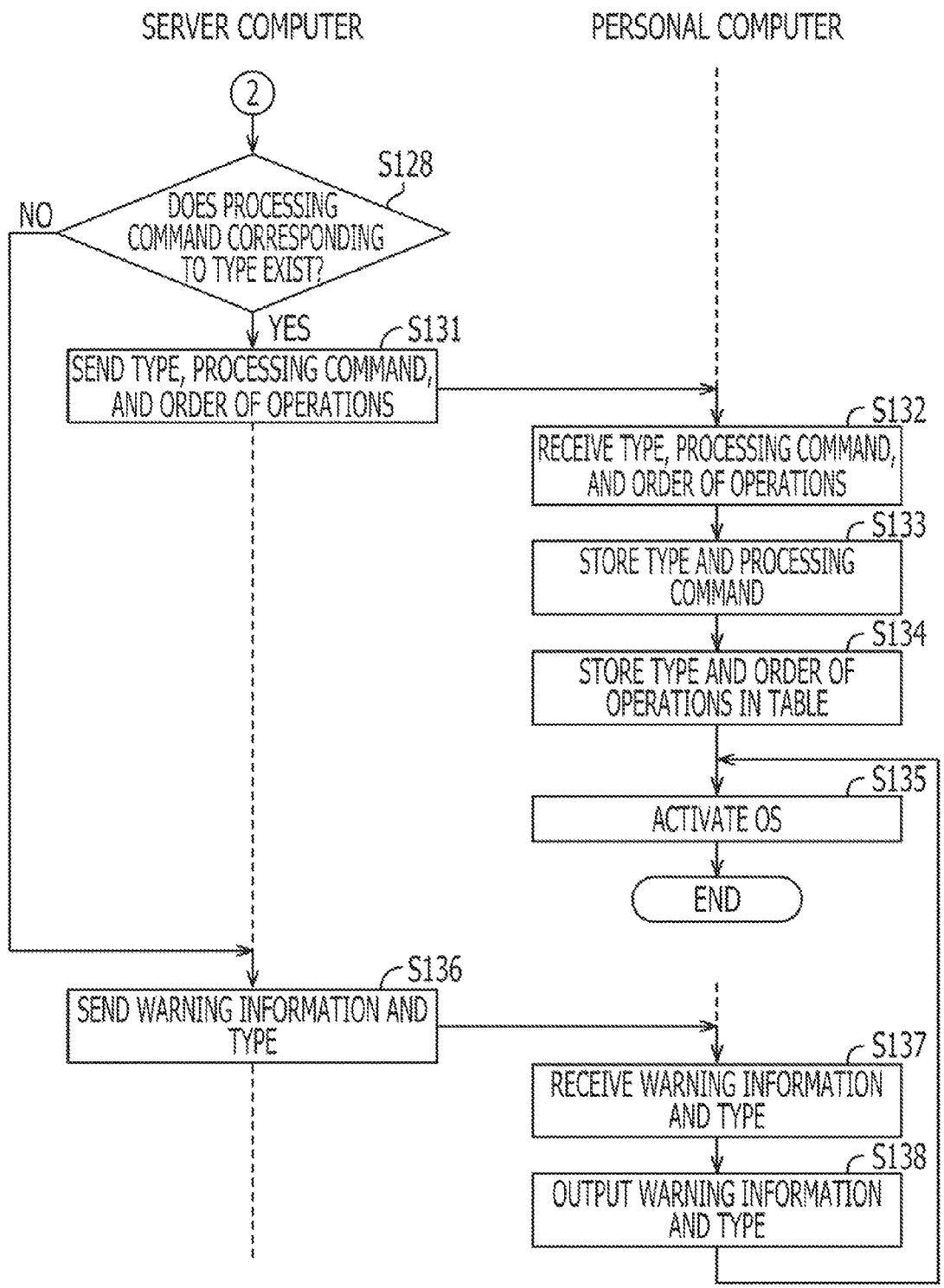
FIG. 13 is a flowchart depicting update processing procedures.

FIGS. 12 and 13 illustrate a flowchart of procedures of update processing. The update processing illustrated in FIGS. 12 and 13 is an example of processing when a user normally activates the computer before losing the computer. The update processing after receiving a security processing command due to loss is described below. The CPU 11 receives an activation command (S121). The CPU 11 reads the BIOS 20 stored in the second memory 17 from the first memory 12 (S122). The CPU 11 obtains the type of the HDD 15 connected thereto (S123).

The CPU 11 determines whether or not the obtained type matches the type stored in the processing command storage unit 25 (S124). If the CPU 11 determines that the types match (S124: Yes), the OS 30 stored in the HDD 15 is activated (S125). If the CPU 11 determines that the types do not match (S124: No), the CPU 11 reads the internet protocol (IP) address of the server computer 5 stored in the second memory 17. The CPU 11 refers to the IP address and sends a request to obtain the processing command and the type to the server computer 5 through the first communication unit 161 (S126).

The CPU 51 of the server computer 5 receives the request to obtain the processing command and the type through the communication unit 56 (S127). The CPU 51 determines whether or not the processing command corresponding to the type is stored in the processing command file 551 (S128). If the CPU 51 determines that the processing command corresponding to the type is stored in the processing command file 151 (S128: Yes), the CPU 51 reads the processing command corresponding to the type. Further, the CPU 51 reads the order of operations corresponding to the type from the processing command file 551. The CPU 51 sends the read type, the processing command, and the order of operations to the personal computer 1 (S131). The CPU 11 of the personal computer 1 receives the type, the processing command, and the order of operations (S132).

The CPU 11 stores the new combination of the type and the processing command in the processing command storage unit 25 (S133). The CPU 11 stores the order of operations and the type received in S132 in the table 26 (S134). Whether the order of operations prioritizes the deletion processing or the interruption processing may be determined according to an appropriate design. Then, the CPU 11 activates the OS 30 (S135).

If in S128 the CPU 51 determines that there is no processing command corresponding to the type (S128: No), the CPU 51 reads warning information previously stored in the storage unit 55. The CPU 51 sends the warning information along with the type to the personal computer 1 (S136). The CPU 11 of the personal computer 1 receives the warning information and the type through the first communication unit 161 (S137). The CPU 11 outputs the warning information and the type to the display unit 14 (S138). For example, a text saying "Your HDD type 'XXX' is not supported and security processing cannot be conducted" or the like may be displayed. Only the warning information may be outputted to the display unit 14. Furthermore, a warning sound or a warning message may be outputted using a speaker (not illustrated). Then, the CPU 11 activates the OS 30 (S135).

Figure 14:
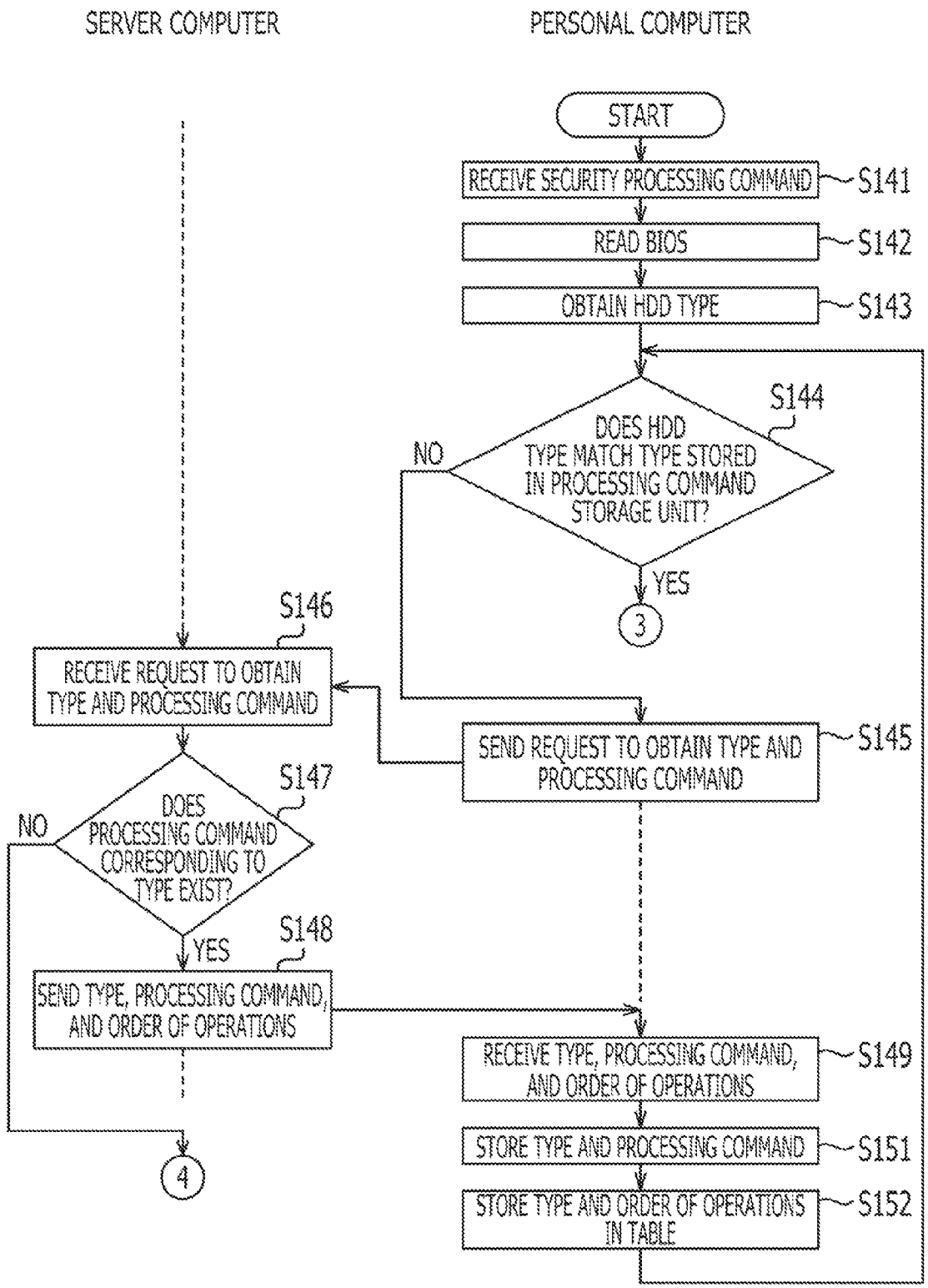
FIG. 14 is a flowchart depicting update processing procedures after receiving a security processing command.
Figure 15:
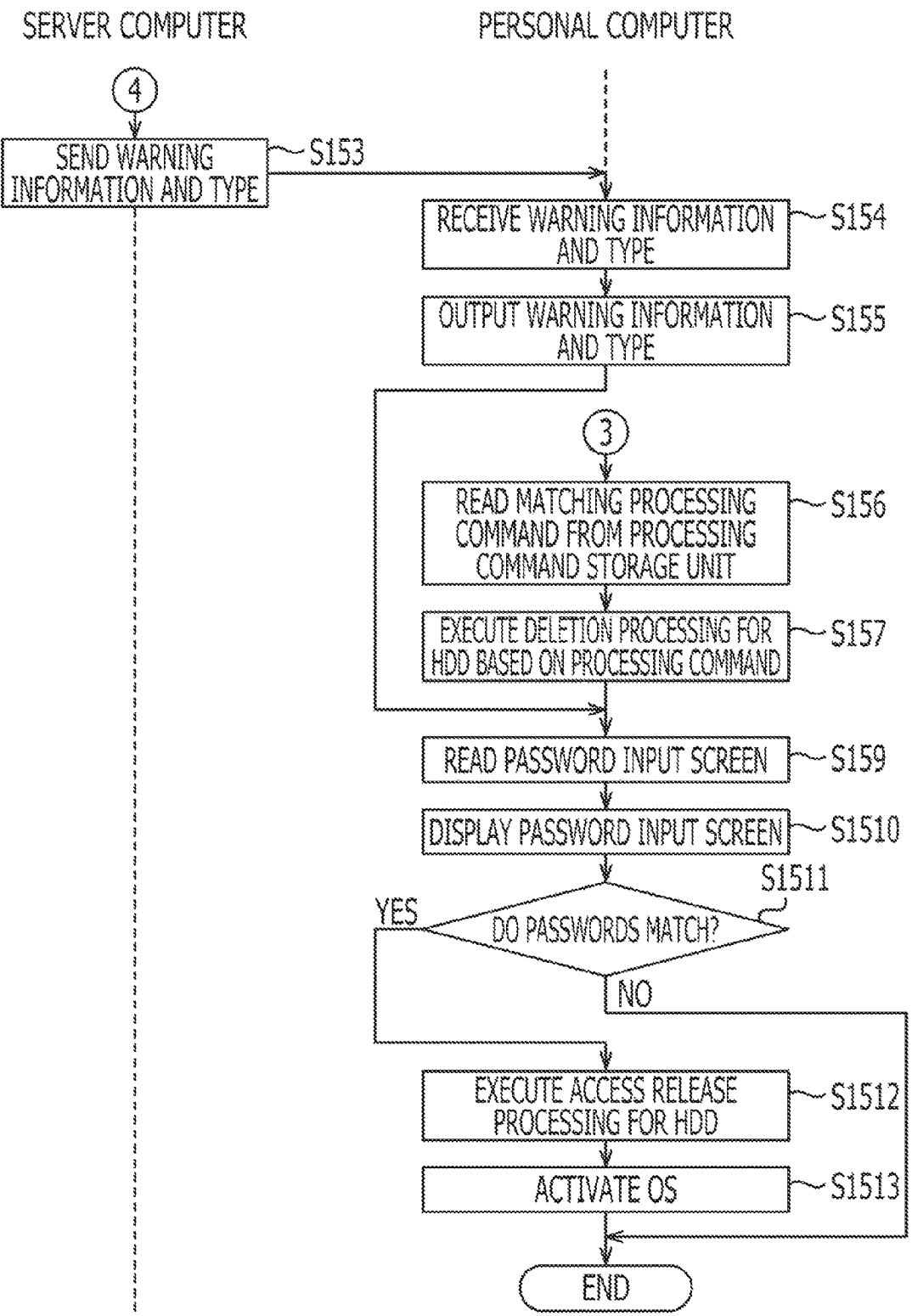
FIG. 15 is a flowchart depicting update processing procedures after receiving a security processing command.

FIGS. 14 and 15 illustrate a flowchart depicting update processing procedures after receiving a security processing command. The server computer 5 sends a security processing command to the personal computer 1. The second communication unit 162 receives the security processing command from the server computer 5 (S141). The second communication unit 162 activates the personal computer 1. The CPU 11 reads the BIOS 20 stored in the second memory 17 from the first memory 12 (S142). The CPU 11 obtains the type of the HDD 15 connected thereto (S143).

The CPU 11 determines whether or not the obtained type matches the type stored in the processing command storage unit 25 (S144). If the CPU 11 determines that the types do not match (S144: No), the CPU 11 reads the IP address of the server computer 5 stored in the second memory 17. The CPU 11 refers to the IP address and sends a request to obtain the processing command and the type to the server computer 5 through the first communication unit 161 (S145).

The CPU 51 of the server computer 5 receives the request to obtain the processing command and the type through the communication unit 56 (S146). The CPU 51 determines whether or not the processing command corresponding to the type is stored in the processing command file 551 (S147). If the CPU 51 determines that the processing command corresponding to the type is stored in the processing command file 151 (S147: Yes), the CPU 51 reads the processing command corresponding to the type. Further, the CPU 51 reads the order of operations corresponding to the type from the processing command file 551. The CPU 51 sends the read type, processing command, and order of operations to the personal computer 1 (S148). The CPU 11 of the personal computer 1 receives the type, the processing command, and the order of operations (S149).

The CPU 11 stores the new combination of the type and the processing command in the processing command storage unit 25 (S151). The CPU 11 stores the order of operations and the type received in S149 in the table 26 (S152). The following processing describes an example where the deletion processing is prioritized. Then, the processing of the CPU 11 returns to S144.

If the CPU 51 determines in S147 that there is no processing command corresponding to the type (S147: No), the CPU 51 reads warning information previously stored in the storage unit 55. The CPU 51 sends the warning information along with the type (S153). The CPU 11 of the personal computer 1 receives the warning information and the type through the first communication unit 161 (S154). The CPU 11 outputs the type and the warning information to the display unit 14 (S155). The CPU 11 reads the password input screen stored in the second memory 17 (S159). The processing may be completed without reading the password input screen after the processing of S155.

If the CPU 11 determines in S144 that the types match (S144: Yes), the process advances to S156. The CPU 11 reads the processing command from the processing command storage unit 25 matching the type (S156). The CPU 11 executes the deletion processing for the HDD 15 based on the processing command (S157). The CPU 11 reads the password input screen stored in the second memory 17 (S159). The CPU 11 displays the password input screen on the display unit 14 (S1510).

The CPU 11 determines whether or not the password entered from the input unit 13 matches the password stored in the second memory 17 (S1511). If the CPU 11 determines that the passwords match (S1511: Yes), the CPU 11 executes the release processing to allow access to the HDD 15 (S1512). The CPU 11 activates the OS 30 (S1513). In this way the interruption processing is released. If the CPU 11 determines that the passwords do not match (S1511: No), the interruption processing is maintained and the processing ends without activating the OS 30. As a result, the processing command can be executed even if a new HDD 15, for which a processing command is not stored in the personal computer 1, is connected to the personal computer 1.

The above is a description of the third embodiment of the present invention, wherein other elements are the same as the first and second embodiments and therefore like elements are indicated with like reference numerals and the corresponding descriptions are omitted.

Fourth Embodiment

Figure 16:
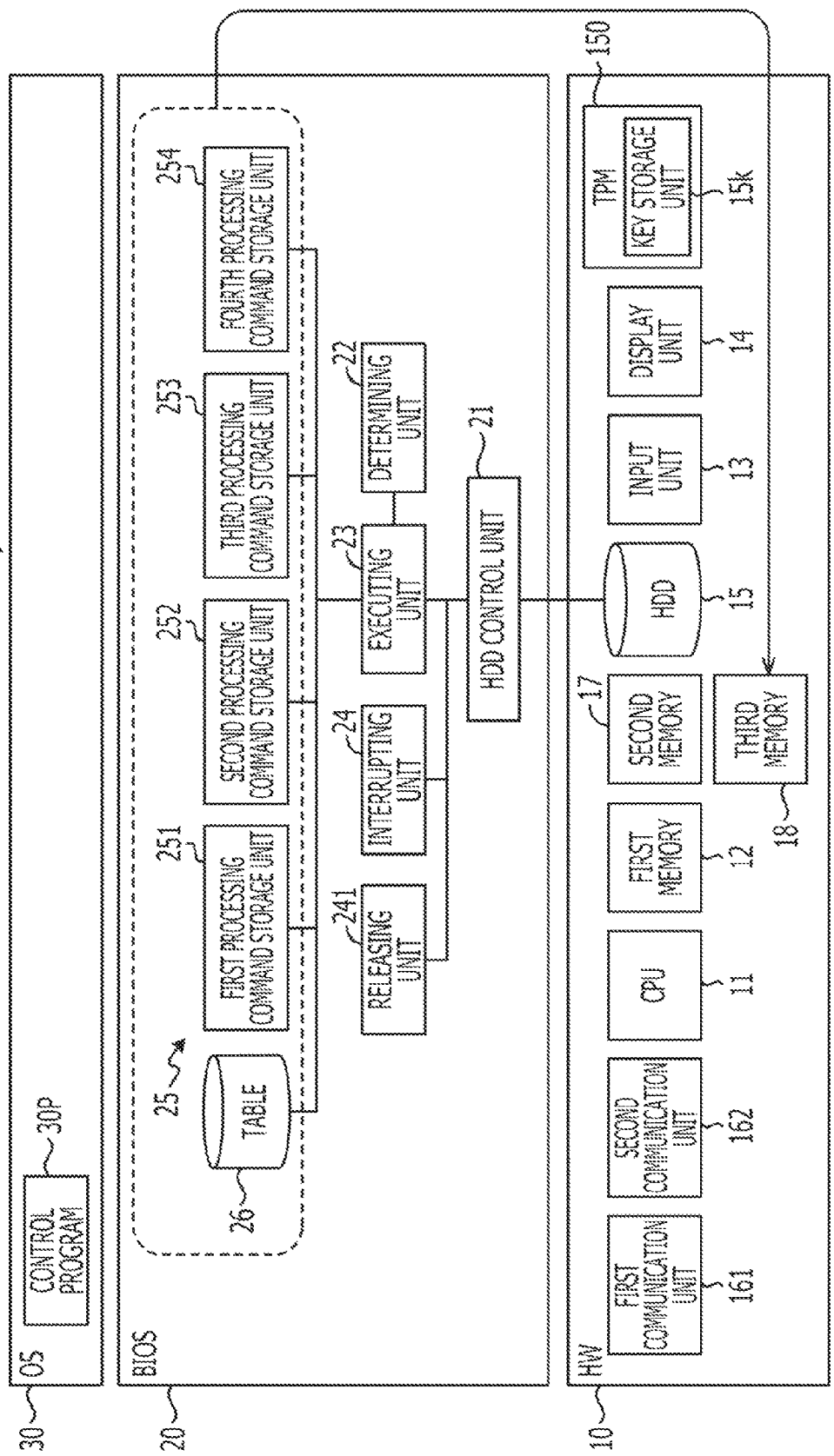
FIG. 16 is a block diagram of hardware and software modules of a personal computer according to a fourth embodiment.

A fourth embodiment relates to the configuration in which the processing command storage unit 25 is stored in another memory. FIG. 16 is a block diagram of hardware and software modules of a personal computer 1 according to the fourth embodiment. The aforementioned processing command storage unit 25 and the table 26 may be stored in a third memory 18 that is physically different from the second memory 17. The third memory 18 is for example a non-volatile memory such as a flash memory or the like. The second memory 17 and the third memory 18 are physically different memories. Programs that cause the personal computer 1 to function as the executing unit 23, the determining unit 22, the HDD control unit 21, the interrupting unit 24, and the releasing unit 241 are stored in the second memory 17.

The table 26, the first processing command storage unit 251, the second processing command storage unit 252, the third processing command storage unit 253, and the fourth processing command storage unit 254 are stored on the third memory 18. The CPU 11 refers to the processing command storage unit 25 corresponding to the type stored in the third memory 18 to execute programs related to the executing unit 23, the determining unit 22, the HDD control unit 21, the interrupting unit 24, and the releasing unit 241 on the first memory 12.

As described in the first and second embodiments, the first processing command storage unit 251, the second processing command storage unit 252, and the third processing command storage unit 253 previously stored at the time of shipping may be stored in the BIOS 20, or more specifically, in the second memory 17. The table 26 and the fourth processing command storage unit 254 may be stored in the third memory 18. Furthermore, the table 26 may be stored in the second memory 17 and the fourth processing command storage unit 254 alone may be stored in the third memory 18. That is, the received type, the order of operations, and the processing command are stored in the third memory 18 due to the connection of a new HDD 15 after shipping. In the example in the third embodiment, the fourth processing command storage unit 254 and the table 26 are stored in the third memory 18 according to the processing in S133 and S134, or S151 and S152. The CPU 11 obtains the type of the HDD 15. The CPU 11 reads the processing command corresponding to the obtained type from the processing command storage unit 25 in the second memory 17 or the third memory 18. The CPU 11 executes the security processing for the HDD 15 according to the processing command read from the second memory 17 or the third memory 18. As a result, it is possible to reduce the possibility that the processing based on the BIOS 20 cannot be executed due to rewriting of the contents.

The above is a description of the fourth embodiment of the present invention, wherein other elements are the same as the first, second, and third embodiments and therefore like elements are indicated with like reference numerals and the corresponding descriptions are omitted.

Fifth Embodiment

Figure 17:
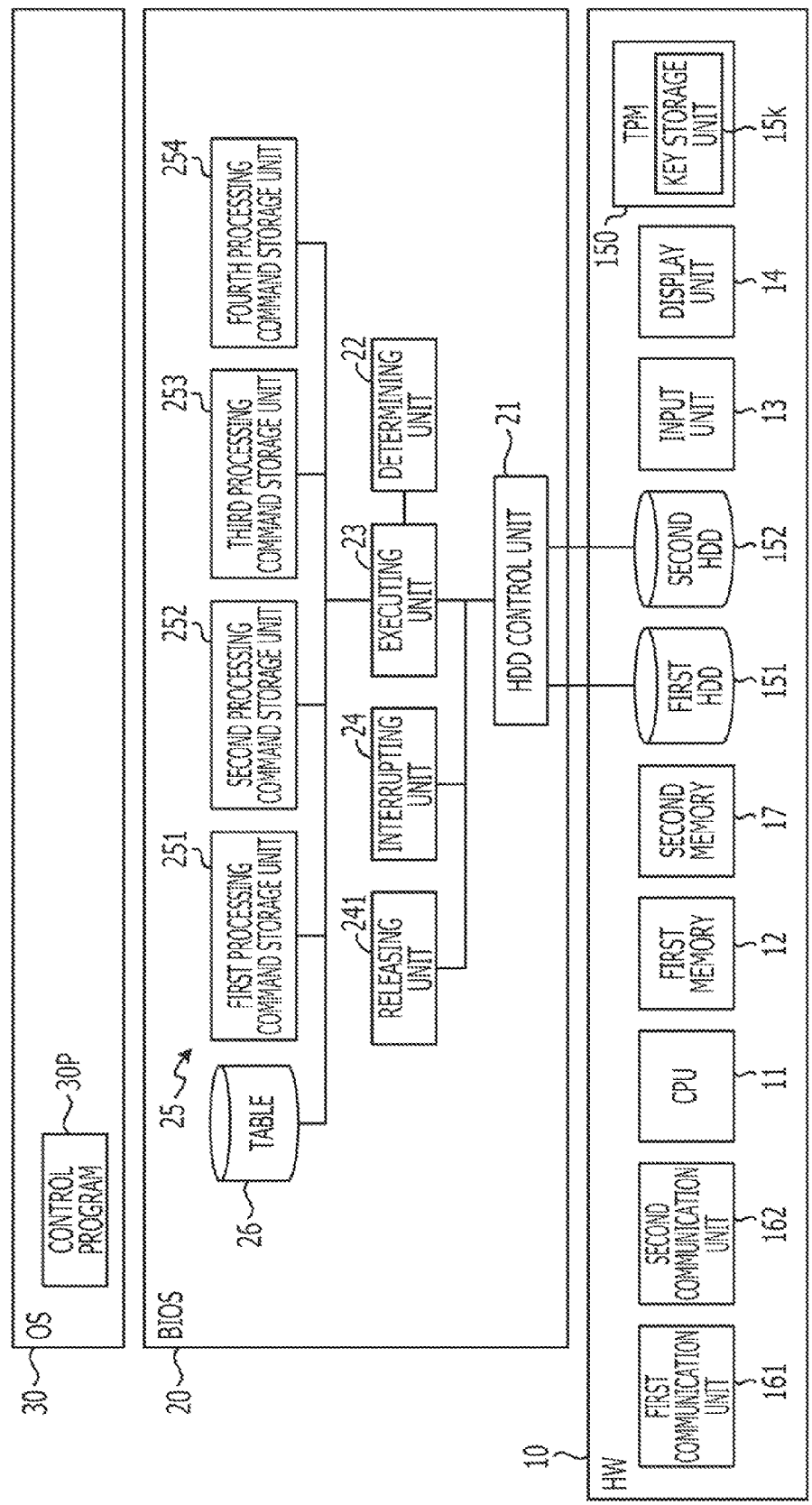
FIG. 17 is a block diagram illustrating hardware and software modules of a personal computer according to a fifth embodiment.

A fifth embodiment of the present invention relates to the configuration in which the personal computer 1 is connected to a plurality of different types of storage devices. FIG. 17 is a block diagram of hardware and software modules of a personal computer 1 according to the fifth embodiment. As illustrated in FIG. 17, a first HDD 151 and a second HDD 152 that are different types are connected to the personal computer 1. The present embodiment describes an example in which there are two different types of HDDs; however this is merely an example and is not limited in this respect. Three or more different types of HDDs may be used. Moreover, both an HDD and an SSD may be used. The determining unit 22 obtains the types of the first HDD 151 and the second HDD 152. The executing unit 23 reads the processing commands corresponding to the obtained types from the processing command storage unit 25. The executing unit 23 conducts the deletion processing for the first HDD 151 based on the read processing command corresponding to the type of the first HDD 151. The executing unit 23 conducts the deletion processing based on the read processing command corresponding to the type of the second HDD 152. To simplify the description, it is assumed that the type of the second HDD 152 is already stored in the processing command storage unit 25 in the description of the present embodiment.

Figure 18:
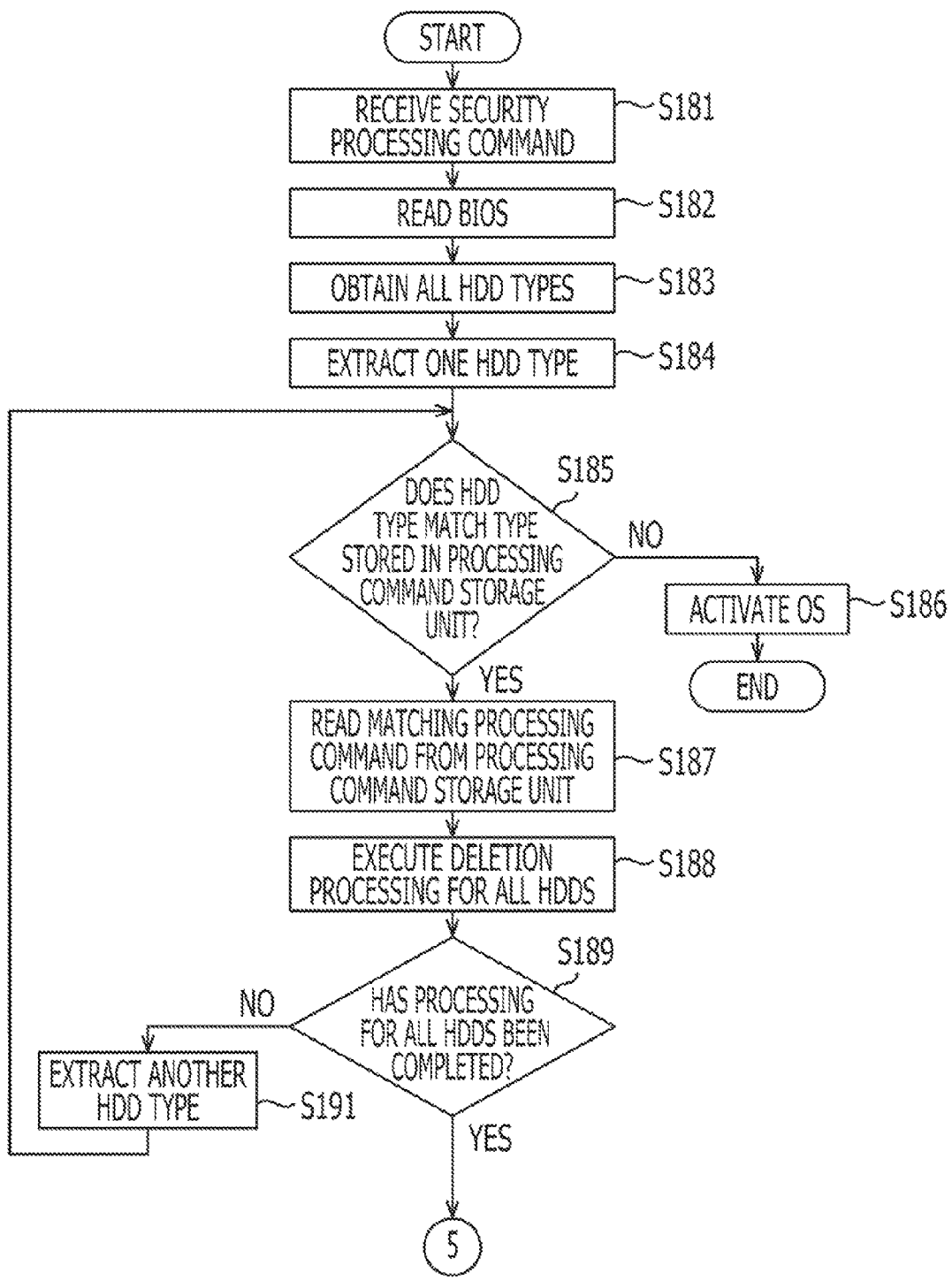
FIG. 18 is a flowchart depicting security processing procedures with multiple HDDs.
Figure 19:
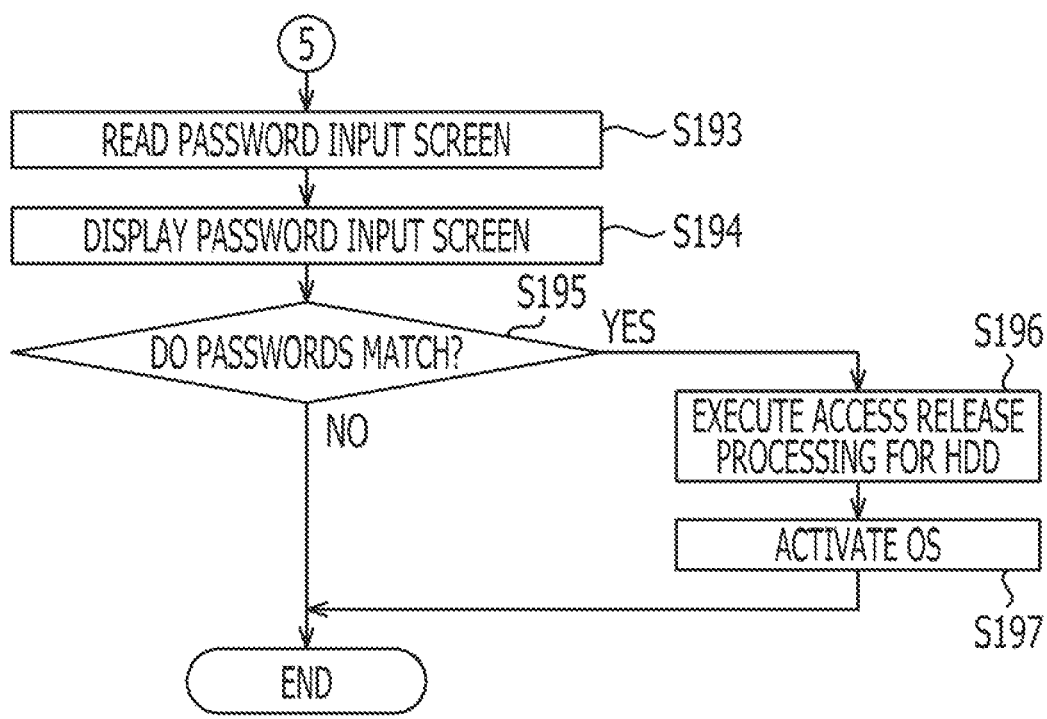
FIG. 19 is a flowchart depicting security processing procedures with multiple HDDs.

FIGS. 18 and 19 illustrate a flowchart depicting security processing procedures with multiple HDDs. The server computer 5 sends a security processing command to the personal computer 1. The second communication unit 162 receives the security processing command from the server computer 5 (S181). The second communication unit 162 activates the personal computer 1. The CPU 11 reads the BIOS 20 stored in the second memory 17 from the first memory 12 (S182). The CPU 11 obtains the types of the connected first HDD 151 and the second HDD 152 (hereinafter, HDD 15 may be used to represent all HDDs in some cases) (S183).

The CPU 11 extracts one type from all the obtained types (S184). The CPU 11 determines whether or not the extracted type matches the types stored in the first processing command storage unit 251, the second processing command storage unit 252, the third processing command storage unit 253, and the fourth processing command storage unit 254 (S185). If the CPU 11 determines that there is no match (S185: No), the CPU 11 activates the OS 30 (S186). As described in the third embodiment, a processing command corresponding to a new type may be received from the server computer 5.

If the CPU 11 determines that there is a match (S185: Yes), the CPU 11 reads the processing command from the processing command storage unit 25 that matches the type (S187). The CPU 11 executes the deletion processing for the HDD 15 based on the processing command (S188). The CPU 11 determines whether or not the processing for the HDD 15 related to all the types obtained in Step S183 is completed (S189). A flag may be set in association with the type of the HDD 15 after the deletion processing when the CPU 11 completes the processing in S188. The CPU 11 refers to the flag and advances to S191 if the CPU 11 determines that the processing for all of the HDDs 15 is not completed (S189: No).

The CPU 11 extracts the type of another HDD 15 other than the type related to the HDD 15 for which the processing has already been completed, from among the types obtained in S183 (S191). The CPU 11 processing returns to S185. By repeating the aforementioned processing, the security processing corresponding to the types is executed for all of the HDDs 15. If the CPU 11 determines that the processing commands corresponding to all of the HDDs 15 has been completed (S189: Yes), the CPU 11 reads the password input screen stored in the second memory 17 (S193). The CPU 11 displays the password input screen on the display unit 14 (S194).

The CPU 11 determines whether or not the password entered from the input unit 13 matches the password stored in the second memory 17 (S195). If the CPU 11 determines that the passwords match (S195: Yes), the CPU 11 executes the release processing to allow access to the HDD 15 (S196). The CPU 11 activates the OS 30 (S197). In this way, the interruption processing is released. If the CPU 11 determines that the passwords do not match (S195: No), the interruption processing is maintained and the processing ends without activating the OS 30. In this way, it is possible to execute the security processing corresponding to the type for the memory devices even when a plurality of types of memory devices are connected according to the environment of the user.

The above is a description of the fifth embodiment of the present invention, wherein other elements are the same as the first to fourth embodiments and therefore like elements are indicated with like reference numerals and the corresponding descriptions are omitted.

Sixth Embodiment

Figure 20:
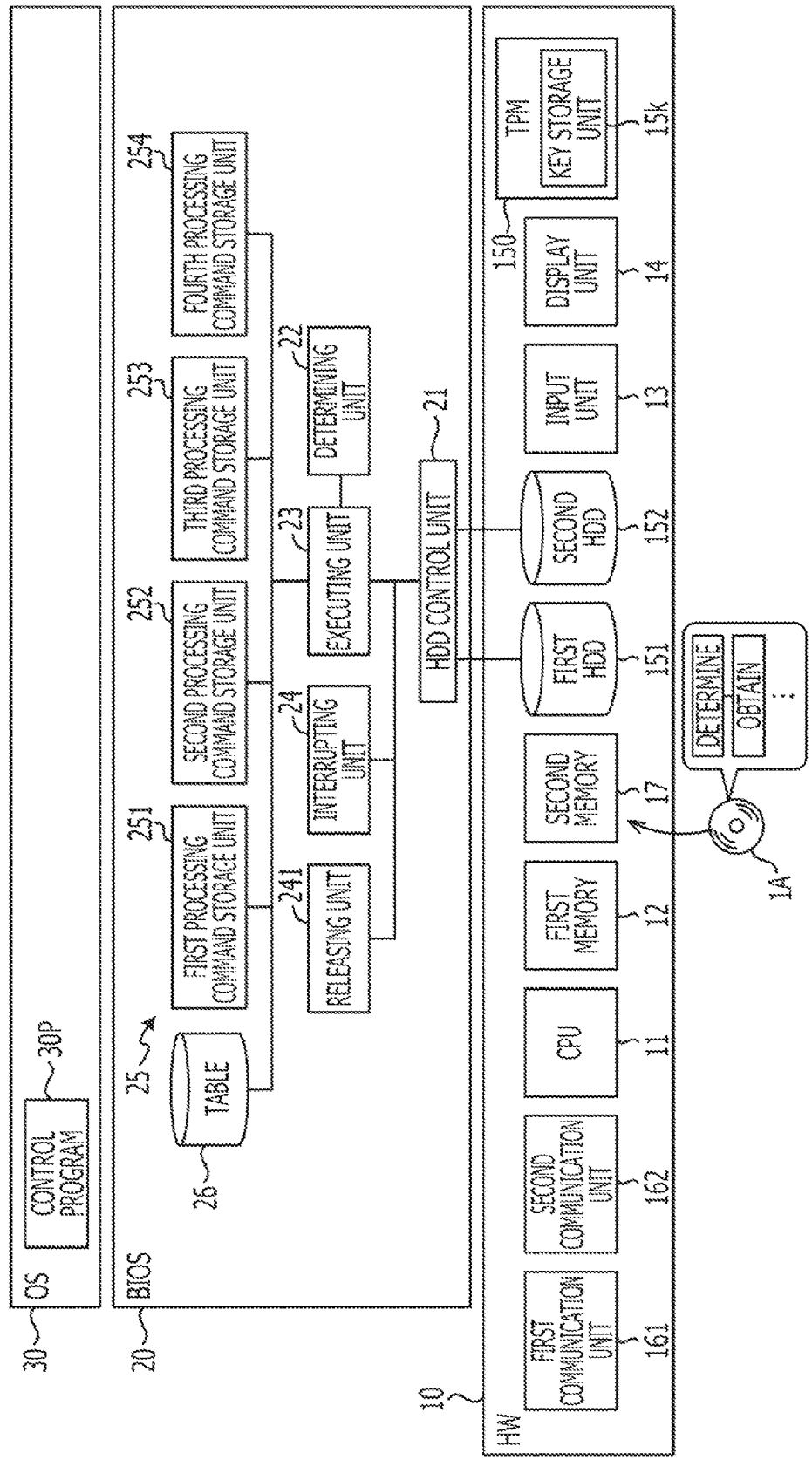
FIG. 20 is a block diagram of hardware and software modules of a personal computer according to a sixth embodiment.

FIG. 20 is a block diagram of hardware and software modules of a personal computer 1 according to a sixth embodiment. A program for operating the personal computer 1 according to the above first to fifth embodiments may be read from a portable storage medium 1A such as a USB memory or a CD-ROM by a reading unit (not illustrated) and stored in the second memory 17. Furthermore, the program may be downloaded from another server computer (not illustrated) that is connected to the personal computer 1 through the communication network N such as the Internet. The following describes the above configuration.

The personal computer 1 illustrated in FIG. 20 downloads a program for executing various types of the aforementioned software processing from another server computer (not illustrated) through the communication network N, or from the portable recording medium 1A. The program is stored in the second memory 17, loaded into the first memory 12 and executed. As a result, the program functions as the aforementioned personal computer 1.

The above is a description of the sixth embodiment of the present invention, wherein other elements are the same as the first to fifth embodiments and therefore like elements are indicated with like reference numerals and the corresponding descriptions are omitted.

A computer readable storage medium that stores the aforementioned program may be a hard disk, a semiconductor memory, a CD-ROM, a USB memory, a DVD memory, or the like. A group of programs may also be transmitted through a network. However, the computer readable storage medium described in the present invention does not include a transitory transmission medium such as a propagation signal.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An information processing apparatus that executes security processing for a storage device connected thereto, the apparatus comprising:
   a plurality of processing command storage units, corresponding to a type of the storage device, that store different processing commands related to security processing according to the type of the storage device; and
   a processor that executes a procedure including:
   a determining process that determines the type of the storage device connected thereto;
   an obtaining process that obtains a processing command corresponding to the type of the storage device determined by the determining process from the corresponding one of the plurality of processing command storage units; and
   an executing process that executes the security processing corresponding to the type of the storage device based on the processing command obtained from the corresponding one of the plurality of processing command storage units.

2. The information processing apparatus according to claim 1 further comprising:
   a receiving process that receives the processing command corresponding to the type of the storage device when the determining process is not able to determine the type of the storage device connected thereto; and
   a storing process that stores the processing command received by the receiving process in the processing command storage unit in association with the type of the storage device.

3. The information processing apparatus according to claim 1, wherein
   the processing command includes a command to delete data stored in the storage device connected thereto, and
   the executing process executes deletion processing on the data stored in the storage device in accordance with the obtained command to delete corresponding to the type of the storage device connected thereto.

4. The information processing apparatus according to claim 1 further comprising:
   an interrupting process that interrupts a transition to processing based on an operating system stored in the storage device.

5. The information processing apparatus according to claim 4 further comprising:
   a table that stores an order of operations that indicates which of the security processing by the executing process and the interrupting of the transition by the interrupting process is to be executed first, corresponding to the type of the storage device; and
   a selecting process that selects and executes one of the security processing by the executing process and the interrupting of the transition by the interrupting process first, based on the order of operations stored in the table and the type of the storage device determined by the determining process.

6. The information processing apparatus according to claim 1, wherein
a program related to the determining process, the obtaining process, and the executing process is stored in a first memory, and the processing command storage unit is stored in a second memory that is different from the first memory.

7. The information processing apparatus according to claim 1, wherein
the determining process determines the types of a plurality of different storage devices connected thereto,
the obtaining process obtains a plurality of processing commands corresponding to the plurality of types of the storage devices determined by the determining process from the plurality of processing command storage units, and
the executing process individually executes the security processing for the storage devices based on the plurality of security commands corresponding to the plurality of types of the storage devices.

8. The information processing apparatus according to claim 2 further comprising
an output process that outputs warning information when the receiving process is not able to receive the processing command.

9. A method implemented by an information processing apparatus that executes security processing for a storage device connected thereto, the method comprising:
determining a type of the connected storage device;
obtaining a processing command corresponding to the determined type of the connected storage device from one of a plurality of processing command storage units that store different processing commands related to the security processing corresponding to types of the connected storage device; and
executing the security processing for the type of connected storage device based on the processing command obtained from the corresponding one of the plurality of processing command storage units.

10. The method according to claim 9 further comprising:
receiving the processing command corresponding to the type of the storage device when the type of the storage device connected thereto is not determined; and
storing the received processing command in the processing command storage unit in association with the type of the storage device.

11. The method according to claim 9, wherein
the processing command includes a command to delete data stored in the connected storage device, and
executing deletion processing on the data stored in the storage device in accordance with the obtained command to delete corresponding to the type of the storage device connected thereto.

12. The method according to claim 9 further comprising:
interrupting a transition to processing based on an operating system stored in the storage device.

13. The method according to claim 12 further comprising:
selecting and executing one of the security processing and the interrupting the transition first based on a table that stores an order of operations that indicates which one of the security processing and the interrupting the transition is to be first, and the determined type of the connected storage device.

14. A computer readable recording medium that stores a program causing a computer to execute a process comprising:
determining a type of connected storage device;
obtaining a processing command corresponding to the determined type of the connected storage device from one of a plurality of processing command storage units that store different processing commands related to the security processing corresponding to types of the storage device; and
executing the security processing for the type of the connected storage device based on the processing command obtained from the corresponding one of the plurality of processing command storage units.

15. The information processing apparatus according to claim 1, wherein the different processing commands include preventing access to the storage device by one of temporarily changing a password, prohibiting use of an encryption key stored in the storage device for a period, and issuing a forbidden command.

* * * * *